3,214,241
GLASS CONTAINING GERMANIUM SULPHIDE
Albert Forber and Alexander Mailer Reid, St. Helens, England, assignors to Pilkington Brothers Limited, Lancashire, England, a corporation of Great Britain
No Drawing. Filed Oct. 29, 1962, Ser. No. 233,932
Claims priority, application Great Britain, Nov. 7, 1961, 39,879/61
7 Claims. (Cl. 23—134)

This invention relates to glass which will transmit a substantial proportion of electromagnetic radiations of a wavelength of 10.5 microns.

There have been suggested in the literature sulphide glasses which will transmit a substantial proportion of electromagnetic radiations of a wavelength of 10.5 microns and even as far as 13 microns, but all these glasses have low softening points, that is to say, below 300° C., so that they are not suitable for many applications. In fact it is believed that the only glass which is in commercial production and which will transmit a substantial proportion of electromagnetic radiation of wavelength 10.5 microns is a glass based on arsenic trisulphide. This commercial glass will in fact transmit radiations of wavelengths greater than 13 microns, but its softening point is of the order of 195° C.

It is a main object of the present invention to provide a glass which will transmit a substantial proportion of electromagnetic radiations of wavelength 10.5 microns, and which has a higher softening point than has heretofore been obtained in such glasses.

A glass manufactured according to the present invention is characterised by having a softening point above 300° C. and being capable of transmitting a substantial proportion of electromagnetic radiations of wavelength from 6.5 microns to 10.5 microns.

More particularly a glass manufactured according to the present invention is characterized by having a softening point above 450° C. and being capable of transmitting a substantial proportion of electromagnetic radiations having a wavelength of 10.5 microns.

In accordance with the present invention it is found that a glass containing by weight from 20% to 75% of germanium sulphide (GeS) and from 10% to 80% of sulphur, the remainder being a compatible sulphide, has a softening point above 450° C. and will transmit a substantial proportion of electromagnetic radiations of wavelength 10.5 microns.

Preferably a glass according to the present invention is obtained from the fusion of a composition containing germanium sulphide and sulphur, the remainder, if any, being a compatible sulphide.

A glass according to the invention may contain other glass-forming components in order to modify its physical and optical properties. Accordingly the present invention also comprehends a glass containing by weight from 20% to 75% of germanium sulphide (GeS) from 10% to 80% of sulphur, from 0% to 25% of gallium sulphide (GaS), from 0% to 25% of indium sulphide ($In_2S_3$) from 0% to 20% of arsenic sulphide ($As_2S_3$) and from 0% to 15% of strontium sulphide (SrS).

Other compatible sulphides may be included in the glass if desired. For example the glass may contain from 0% to 5% of zinc sulphide (ZnS) and from 0% to 5% of tin sulphide (SnS).

Germanium disulphide ($GeS_2$) may also be used as a component of a glass according to the present invention, but when germanium disulphide is used, precautions must be taken to ensure that this does not include a significant proportion of germanium dioxide ($GeO_2$) because the presence in the glass of germanium dioxide, which is formed from germanium disulphide in the presence of moist air, reduces the transmissions of the glass to electromagnetic radiations of wavelength greater than 5.5 microns.

The present invention therefore also comprehends a glass containing at most 100% by weight of germanium disulphide ($GeS_2$). More particularly the invention, according to this aspect, comprehends a glass containing by weight from 80% to 100% of germanium disulphide ($GeS_2$), the remainder being a compatible sulphide.

The invention also comprehends a germanium sulphide glass obtained by the fusion of a batch composition containing, by weight, from 20% to 75% of germanium sulphide (GeS) and from 10 to 80% of sulphur, as well as glass obtained by the fusion of a batch composition containing from 80% to 100% of germanium disulphide ($GeS_2$), the remainder, if any, in each case being a compatible sulphide.

In order that the present invention may be more fully understood, there are given by way of illustration the following examples of the compositions of glasses according to the invention, together with the melting temperature and the annealing temperature of the glass. In each case, the glass is obtained from a batch having substantially the same composition by weight as the resulting glass.

| No. | Glass Composition by Weight | Melting Temperature, ° C. | Annealing Temperature, ° C. |
|---|---|---|---|
| 1 | GeS—40%<br>S—60% | 800 | 400 |
| 2 | GeS—50%<br>S—50% | 800 | 300 |
| 3 | GeS—68%<br>S—22%<br>GaS—10% | 1,100 | 350 |
| 4 | GeS—68%<br>S—22%<br>GaS—10% | 800 | 350 |
| 5 | GeS—68%<br>S—22%<br>$In_2S_3$—10% | 800 | 300 |
| 6 | GeS—51%<br>S—34%<br>$As_2S_3$—15% | 800 | 300 |
| 7 | GeS—75%<br>S—20%<br>SrS—5% | 850 | 350 |
| 8 | $GeS_2$—100% | 800 | 300 |
| 9 | $GeS_2$—95%<br>GaS—5% | 800 | 400 |
| 10 | $GeS_2$—90%<br>GaS—10% | 800 | 400 |
| 11 | $GeS_2$—85%<br>$In_2S_3$—15% | 800 | 350 |
| 12 | $GeS_2$—80%<br>$In_2S_3$—20% | 800 | 350 |

Glass according the the present invention is made by fusion of a batch containing glass-forming components in proportions which will give rise to a glass of the desired composition followed by subsequent manipulation by techniques well known in the manufacture of optical glass.

The following is given as a specific example of a manner of producing a germanium sulphide glass according to the present invention, which glass is capable of transmitting a substantial proportion of electromagnetic radiations of wavelength 10.5 microns and having a softening point in excess of 450° C.

A glass batch having the composition of 40 grams GeS and 60 grams S was heated in a fused silica crucible at a temperature of 1000° C. until the batch was completely fused. During the heating process, oxidation of the germanium sulphide is prevented by using a lid on the crucible. In order to cool the glass, the molten batch is cast into a muffle heated to 450° C. and is cooled down slowly from a temperature of 450° C. to room temperature, for example at 1.5° C. per minute.

Alternatively oxidation of the germanium sulphide is prevented by carrying out the heating in an inert atmosphere, for example of nitrogen.

Although a temperature of 1000° C. has been mentioned for the temperature of fusing the glass batch, it will be appreciated that this temperature may be anywhere in the range from 800° C. to 1250° C. depending on the components of the batch being fused. Similarly the temperature of the muffle may be anywhere in a range from 400° C. to 450° C.

It is found that glass according to the invention will transmit a substanital proportion of electromagnetic radiations of wavelengths between 6.5 microns and 10.5 microns.

The percentage transmission obtained through a glass of 2 mm. thickness made from glasses having the compositions above exemplied are given in the following table:

| Example No. | Percentage Transmissions at Wavelengths | | | | | | |
|---|---|---|---|---|---|---|---|
| | $5\mu$ | $6\mu$ | $7\mu$ | $8\mu$ | $9\mu$ | $10\mu$ | $10.5\mu$ |
| 1 | 70 | 70 | 65 | 27 | 52 | 36 | 13 |
| 2 | 68 | 66 | 61 | 26 | 47 | 37 | 18 |
| 3 | 61 | 62 | 60 | 42 | 42 | 44 | 37 |
| 4 | 63 | 61 | 52 | 24 | 23 | 11 | 6 |
| 5 | 58 | 58 | 55 | 25 | 47 | 37 | 22 |
| 6 | 43 | 44 | 42 | 24 | 30 | 31 | 19 |
| 7 | 48 | 47 | 35 | 7 | 19 | 4 | ------ |
| 8 | 64 | 63 | 18 | 5 | 28 | 4 | ------ |
| 9 | 70 | 63 | 20 | 4 | 11 | 1 | ------ |
| 10 | 66 | 61 | 25 | 8 | 11 | 2 | ------ |
| 11 | 62 | 59 | 18 | 6 | 17 | 2 | ------ |
| 12 | 68 | 63 | 15 | 5 | 15 | 1 | ------ |

We claim:

1. Glass containing by weight from 20% to 75% of germanium sulphide (GeS) and from 10% to 80% of sulphur, the remainder consisting essentially of a compatible sulphide.

2. Glass consisting essentially of by weight from 20% to 75% of germanium sulphide (GeS), from 10% to 80% of sulphur, from 0% to 25% of gallium sulphide (GaS), from 0% to 25% of indium sulphide ($In_2S_3$), from 0% to 20% of arsenic sulphide ($As_2S_3$) and from 0% to 15% of strontium sulphide (SrS), said glass having a softening point above 450° C. and being capable of transmitting a substantial proportion of electromagnetic radiations having a wavelength of $10.5\mu$.

3. A germanium sulphide glass containing from 20% to 75% by weight of germanium sulphide (GeS), and from 10% to 80% by weight of sulphur, the balance being germanium disulphide ($GeS_2$) and the glass being capable of transmitting a substanital proportion of electromagnetic radiations of wavelengths of $10.5\mu$ and having a softening point above 450° C.

4. Glass consisting essentally of germanium disulphide ($GeS_2$).

5. Glass containing by weight from 80% to almost 100% of germanium disulphide ($GeS_2$), the remainder consisting essentially of a compatible sulphide.

6. Glass containing at least 20% by weight of germanium sulphide (GeS), the remainder consisting essentially of a member of the class consisting of sulphur, a compatible sulphide, and mixtures thereof.

7. Glass consisting essentially of by weight from 20% to 75% of germanium sulphide (GeS), from 10% ot 80% of sulphur, from 0% to 25% of gallium sulphide (GaS), from 0% to 25% of indium sulphide ($In_2S_3$), from 0% to 20% of arsenic sulphide ($As_2S_3$), from 0% to 15% of strontium sulphide (SrS), from 0% to 5% of zinc sulphide (ZnS) and from 0% ot 5% of tin sulphide (SnS).

References Cited by the Examiner

UNITED STATES PATENTS

| | | | |
|---|---|---|---|
| 2,883,292 | 4/59 | Jerger | 106—47 |
| 2,883,294 | 4/59 | Jerger | 106—47 |
| 2,979,382 | 4/61 | Frerichs | 106—47 |
| 3,024,119 | 3/62 | Flaschen et al. | 106—47 |
| 3,117,013 | 1/64 | Northover et al. | 106—47 |

TOBIAS E. LEVOW, *Primary Examiner.*